(12) United States Patent
VanWalleghem et al.

(10) Patent No.: US 9,410,559 B2
(45) Date of Patent: Aug. 9, 2016

(54) ENERGY-ACCUMULATION APPARATUS

(71) Applicants: Curtis VanWalleghem, Toronto (CA); Cameron Lewis, Toronto (CA)

(72) Inventors: Curtis VanWalleghem, Toronto (CA); Cameron Lewis, Toronto (CA)

(73) Assignee: Hydrostor, Inc., Canada ( * ) Notice: Subject to any disclaimer, the term of this patent is extended or adjusted under 35 U.S.C. 154(b) by 0 days.

(21) Appl. No.: 14/167,198

(22) Filed: Jan. 29, 2014

(65) Prior Publication Data

US 2015/0214815 A1    Jul. 30, 2015

(51) Int. Cl.
*F15B 1/027* (2006.01)
*F03D 9/02* (2006.01)
*F04B 41/02* (2006.01)
*F17B 1/26* (2006.01)
*H02J 15/00* (2006.01)
*F17C 1/00* (2006.01)

(52) U.S. Cl.
CPC ............ *F15B 1/027* (2013.01); *F03D 9/028* (2013.01); *F04B 41/02* (2013.01); *F17B 1/26* (2013.01); *F17C 1/007* (2013.01); *H02J 15/006* (2013.01); *F05B 2260/42* (2013.01); *F17C 2201/0147* (2013.01); *F17C 2201/054* (2013.01); *F17C 2203/0617* (2013.01); *F17C 2203/0685* (2013.01); *F17C 2205/0126* (2013.01); *F17C 2205/0142* (2013.01); *F17C 2205/0184* (2013.01); *F17C 2221/031* (2013.01); *F17C 2223/0123* (2013.01); *F17C 2223/035* (2013.01); *F17C 2223/036* (2013.01); *F17C 2260/046* (2013.01); *F17C 2270/0581* (2013.01); *Y02E 10/725* (2013.01); *Y02E 60/15* (2013.01); *Y02E 60/17* (2013.01)

(58) Field of Classification Search
CPC ............................... Y02E 10/38; Y02E 10/32
USPC ............... 290/42, 43, 53, 54; 417/330–333; 416/7, 85; 415/5, 495; 60/495–502
See application file for complete search history.

(56) References Cited

U.S. PATENT DOCUMENTS

| | | | |
|---|---|---|---|
| 4,422,799 A | 12/1983 | Green et al. | |
| 5,513,886 A | 5/1996 | Cyr | |
| 8,123,579 B2 * | 2/2012 | Gerber | 441/1 |
| 2007/0231072 A1 * | 10/2007 | Jennings et al. | 405/75 |
| 2008/0093852 A1 * | 4/2008 | Vowles et al. | 290/42 |
| 2009/0284014 A1 * | 11/2009 | Sieber et al. | 290/53 |
| 2010/0107627 A1 * | 5/2010 | Morgan | 60/495 |
| 2010/0171312 A1 * | 7/2010 | Burns | 290/53 |

(Continued)

FOREIGN PATENT DOCUMENTS

FR       2993016      1/2014
WO    2014170723    10/2014

OTHER PUBLICATIONS

PCT/IB2015/050582 International Search Report and Written Opinion, completed May 27, 2015.

*Primary Examiner* — Tulsidas C Patel
*Assistant Examiner* — Sean Gugger
(74) *Attorney, Agent, or Firm* — Tarolli, Sundheim, Covell & Tummino LLP

(57) ABSTRACT

An energy-accumulation apparatus includes a variable-buoyancy assembly configured to be selectively buoyant in a body of water. The energy-accumulation apparatus also includes a delivery assembly coupled to the variable-buoyancy assembly. The delivery assembly is configured to deliver the variable-buoyancy assembly within the body of water between a first position to a second position.

22 Claims, 10 Drawing Sheets

(56) References Cited

U.S. PATENT DOCUMENTS

| | | | |
|---|---|---|---|
| 2012/0112472 A1 | 5/2012 | Murray et al. | |
| 2012/0275544 A1* | 11/2012 | Midya et al. | 375/297 |
| 2012/0285544 A1* | 11/2012 | Westby et al. | 137/1 |
| 2012/0304637 A1* | 12/2012 | Allen et al. | 60/501 |
| 2013/0082465 A1* | 4/2013 | Frich | 290/53 |
| 2013/0134715 A1* | 5/2013 | Sinclaire | 290/54 |
| 2014/0033624 A1 | 2/2014 | Blaxland et al. | |
| 2015/0159623 A1* | 6/2015 | Frich | 290/53 |

\* cited by examiner

ENERGY-ACCUMULATION APPARATUS

TECHNICAL FIELD

Some aspects generally relate to (and are not limited to) an energy-accumulation apparatus. More specifically, some aspects relate to: (A) an energy-accumulation apparatus, including a combination of a variable-buoyancy assembly and a delivery assembly; (B) a renewable-energy electric-generating system, including an energy-accumulation apparatus; and/or (C) a method of servicing an energy-accumulation apparatus (amongst other things).

BACKGROUND

Energy storage is accomplished by devices and/or physical media configured to receive and to store energy, and to provide the stored energy that is to be consumed or used at a later time (on demand) for useful operations as may be required. A device configured to store energy is called an energy-accumulation apparatus.

A renewable-energy system (such as a wind turbine and/or a solar panel) is configured to convert energy received from a renewable-energy source (wind and/or solar) into electricity, which may be classified as intermittent electric power. Wherever intermittent power sources are connected to (deployed in) an electrical grid (or grid), energy storage becomes an option to improve reliable supply of energy.

A technique called renewable-energy time shift is a method that includes the use of energy storage to mitigate rapid output changes from the generation of electricity based upon the variability of renewable-energy sources, due to: (A) wind speed variability affecting wind generation, and/or (B) shading of solar generation due to cloud cover. Generated electricity is stored in the energy-accumulation apparatus (such as a battery) when the demand is relatively lower, and when renewable sources are active; later, when the demand for electricity increases, the energy stored in the energy-accumulation device is used for the purpose of generating electricity to be applied to the electric grid.

In view of the foregoing, many technical problems associated with the storage of energy (such as the storage of energy derived from renewable-energy sources) continue to challenge the renewable-energy industry faced with the increased demand for affordable electric energy.

SUMMARY

Problems associated with energy storage systems were researched in association with the storage of energy generated by a renewable-energy source, in which the stored energy is to be consumed at a later time. After much study, an understanding of the problem and its solution has been identified, which is stated below.

Electricity storage is highly sought after for the purpose of continuing the supply of generated electricity while renewable-energy sources are not available. Unfortunately, renewable-energy sources are inherently discontinuous or intermittent and cannot be relied upon to generate and provide electricity on demand. Electrical energy produced by the renewable source during a non-peak demand period is stored.

It is also very important to perform preventative maintenance operations on the energy-accumulation apparatus used in association with a renewable-energy electric-generating system (wind turbines, solar panels), as well as perform necessary repairs to the energy-accumulation apparatus are important aspects for keeping ongoing operating costs within acceptable limits. Therefore, to resolve the problem of maintenance/repair, the energy-accumulation apparatus is configured to facilitate, at least in part, performance of preventative maintenance and/or necessary repairs, thereby lowering the cost of supplying the electricity generated by the renewable-energy electric-generating system to the electric grid.

In order to mitigate, at least in part, the problem(s) identified above, in accordance with an aspect, there is provided an energy-accumulation apparatus including a variable-buoyancy assembly. The variable-buoyancy assembly is configured to be selectively buoyant in a body of water. The energy-accumulation apparatus also includes a delivery assembly coupled to the variable-buoyancy assembly. The delivery assembly is configured to deliver the variable-buoyancy assembly within the body of water between a first position to a second position.

In accordance with an option, in the first position, the variable-buoyancy assembly is serviceable (and in a non-operational mode). In the second position, the variable-buoyancy assembly is on-line (and in an operational mode). The first position is spaced apart from the second position.

In accordance with a detailed option of the energy-accumulation apparatus, the delivery assembly is configured to facilitate movement of the variable-buoyancy assembly from (A) the first position in which the variable-buoyancy assembly is non-operational (so that maintenance may be performed on the variable-buoyancy assembly) to (B) the second position in which the variable-buoyancy assembly is operational.

In order to mitigate, at least in part, the problem(s) identified above, in accordance with an aspect, there is provided a renewable-energy electric-generating system, including the energy-accumulation apparatus described above.

In order to mitigate, at least in part, the problem(s) identified above, in accordance with an aspect, there is provided a renewable-energy electric-generating system being configured to connect to an electric grid (902), including: the energy-accumulation apparatus described above.

In order to mitigate, at least in part, the problem(s) identified above, in accordance with an aspect, there is provided an electric grid, including the energy-accumulation apparatus described above.

In order to mitigate, at least in part, the problem(s) identified above, in accordance with an aspect, there is provided a method of servicing an energy-accumulation apparatus. The method includes delivering a variable-buoyancy assembly configured to be selectively buoyant within a body of water between a first position to a second position in such a way that in the first position, the variable-buoyancy assembly is serviceable.

In order to mitigate, at least in part, the problem(s) identified above, in accordance with an aspect, there is provided other aspects as identified in the claims.

Other aspects and features of the non-limiting embodiments may now become apparent to those skilled in the art upon review of the following detailed description of the non-limiting embodiments with the accompanying drawings.

DETAILED DESCRIPTION OF THE DRAWINGS

The non-limiting embodiments may be more fully appreciated by reference to the following detailed description of the non-limiting embodiments when taken in conjunction with the accompanying drawings, in which.

Figure 1A:
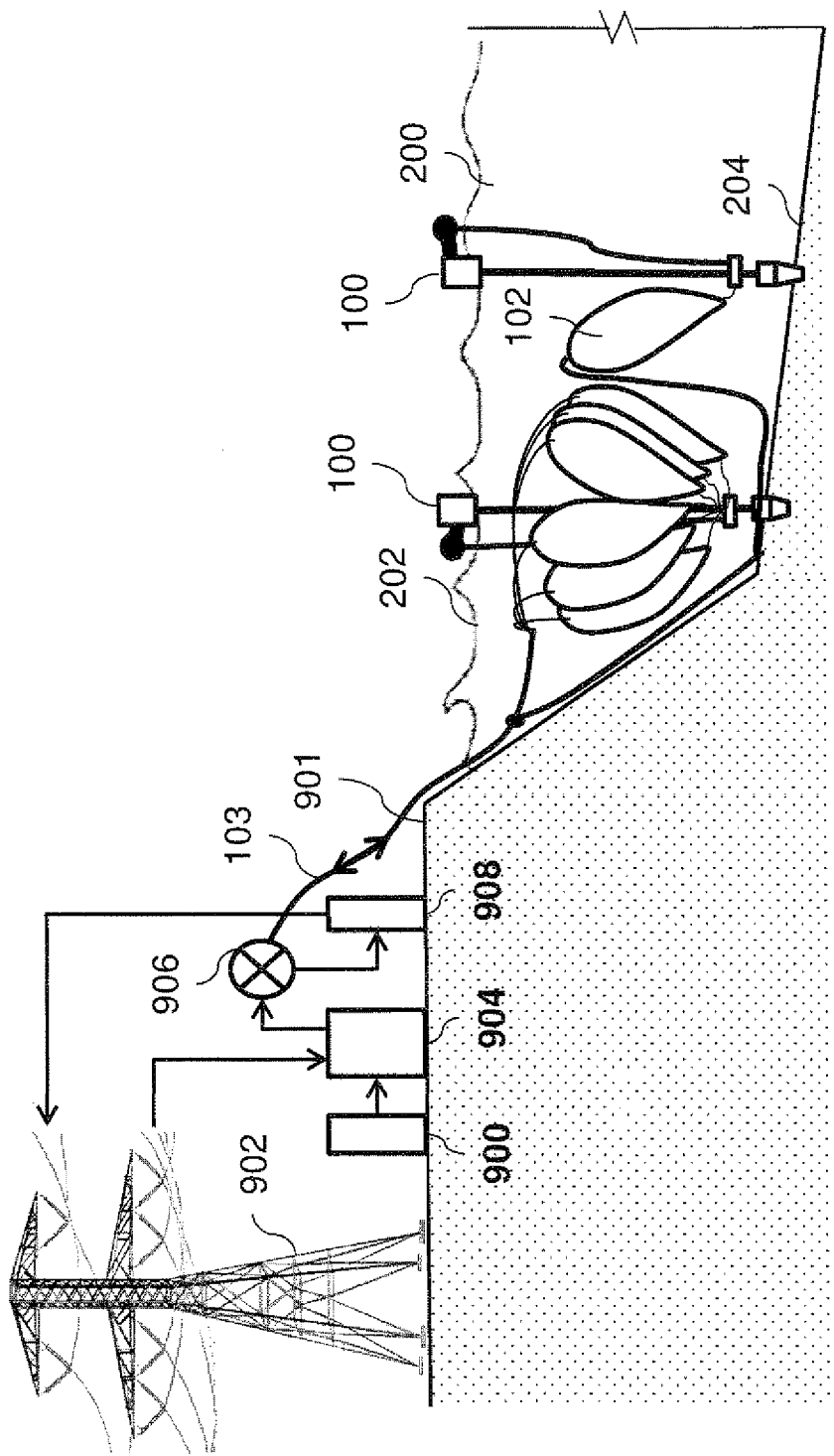
FIG. 1A (SHEET 1/10) depicts an example schematic representation of an energy-accumulation apparatus.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 100 energy-accumulation apparatus
102 variable-buoyancy assembly
103 air-supply assembly
104 delivery assembly
105 air-line joint
108 take-up reel
109 service line
110 flotation assembly
112 anchor-connection line
114 anchor assembly
116 connection assembly
118 flexible-wall bladder
120 pneumatically-pressurizable chamber
122 auxiliary take-up reel
124 auxiliary connection line
126 pulley assembly
128 collection
200 body of water
202 water surface
204 floor
900 renewable-energy electric-generating system
901 shore
902 electric grid
904 pneumatic-generation source
906 switch assembly
908 electric generator

DETAILED DESCRIPTION OF THE NON-LIMITING EMBODIMENT(S)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a".

Figure 1B:
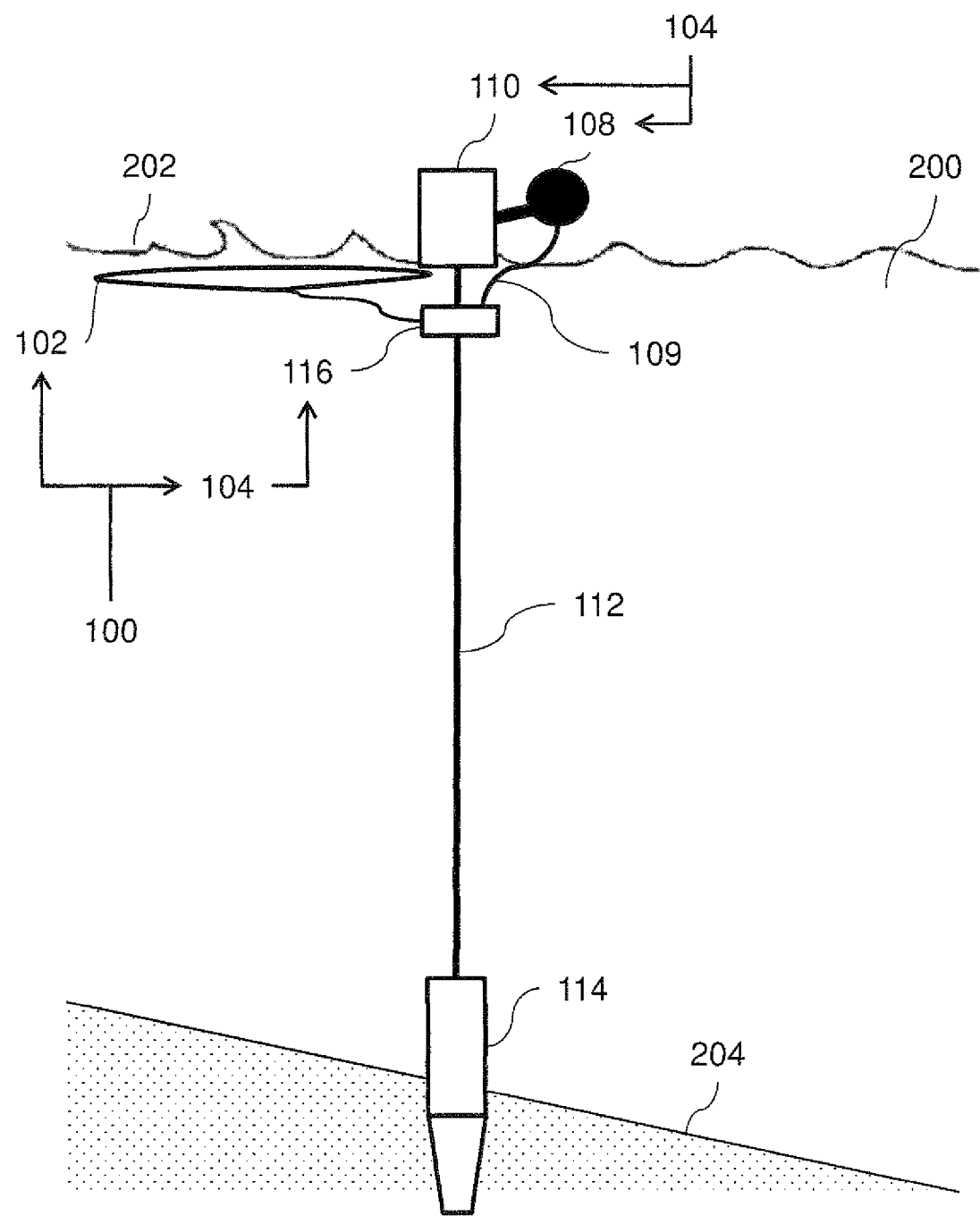
FIG. 1B (SHEET 2/10) depicts another example schematic representation of the energy-accumulation apparatus of FIG. 1A.
Figure 1C:
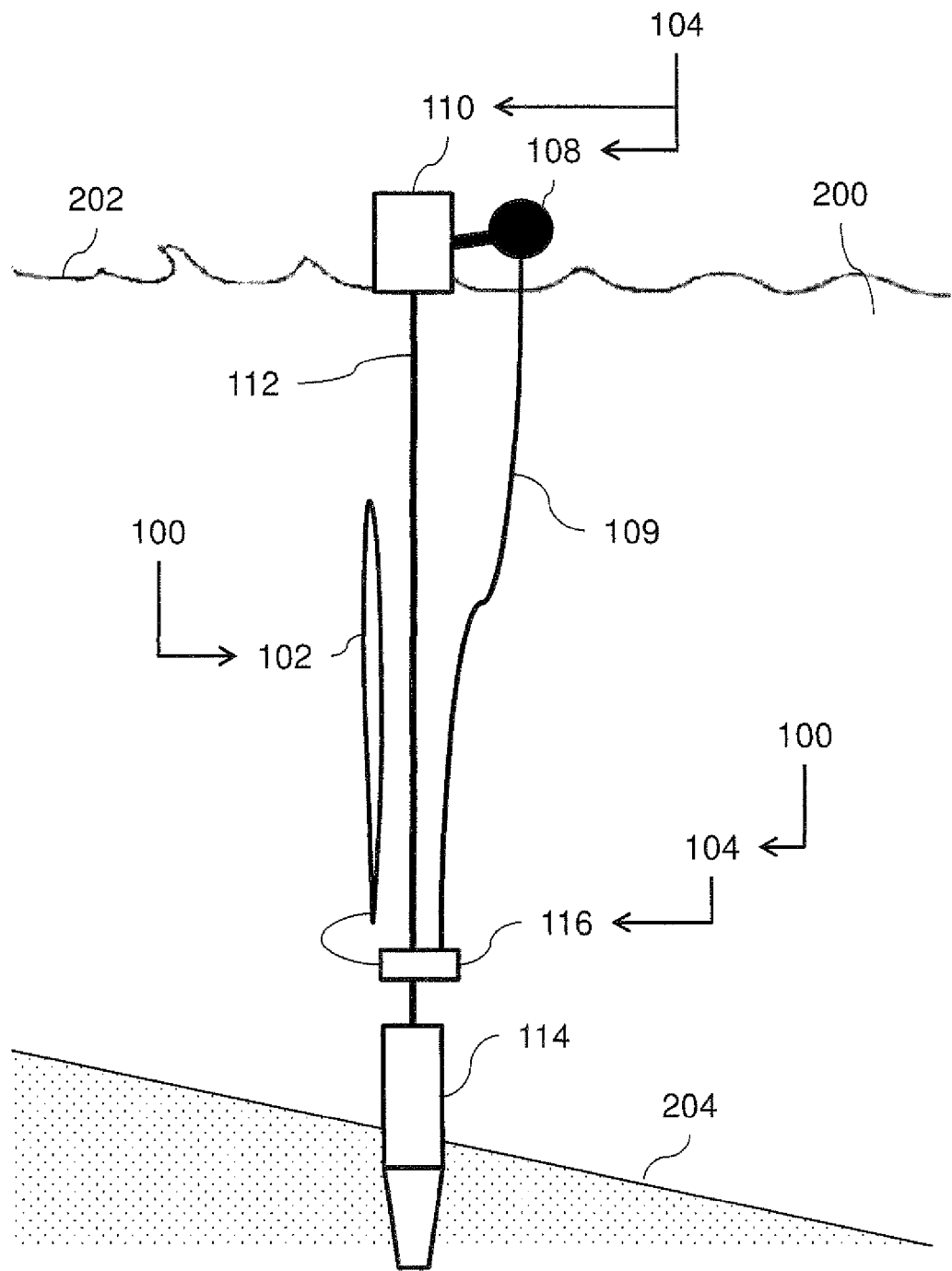
FIG. 1C (SHEET 3/10) depicts yet another example schematic representation of the energy-accumulation apparatus of FIG. 1A.
Figure 1D:
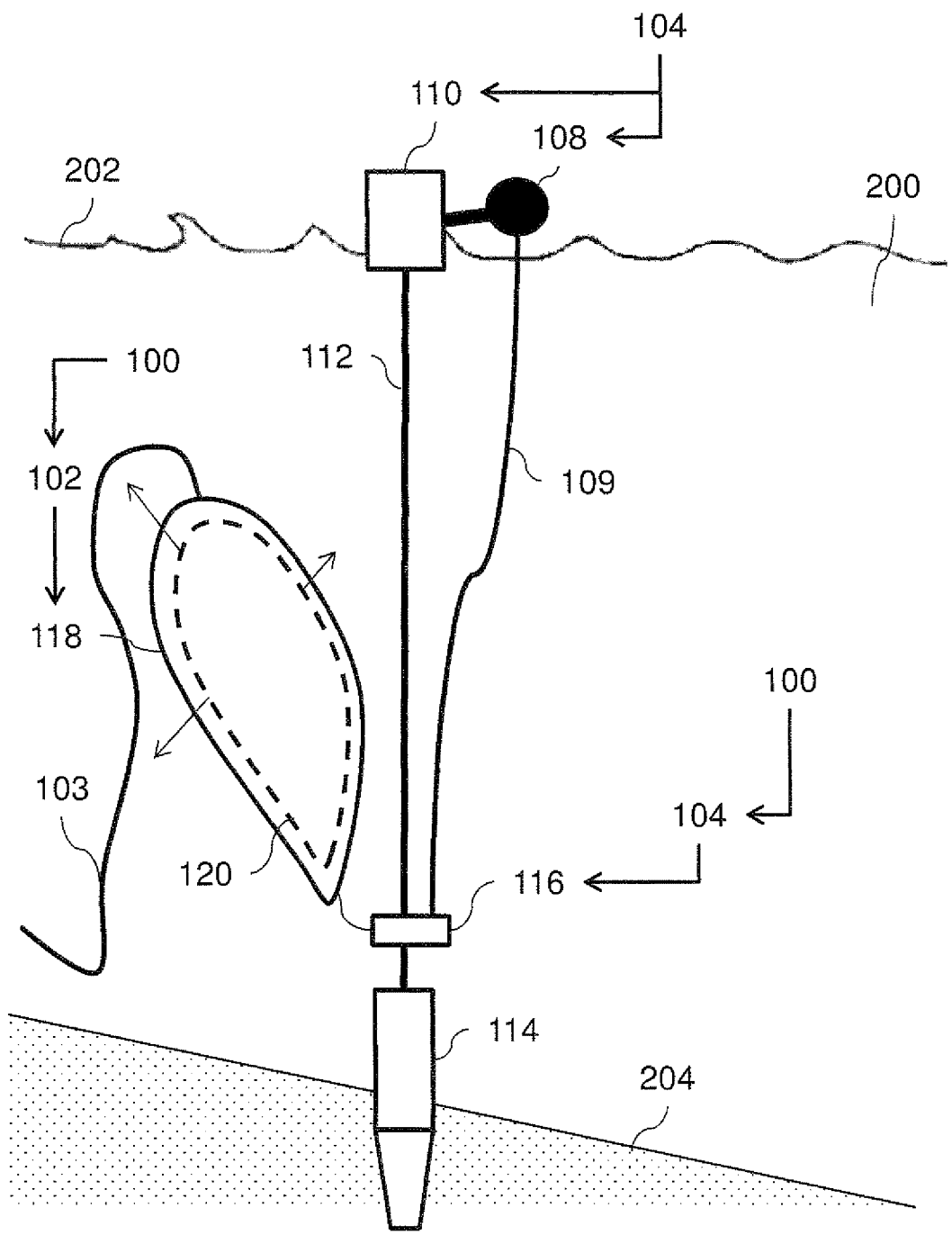
FIG. 1D (SHEET 4/10) depicts yet another example schematic representation of the energy-accumulation apparatus of FIG. 1A.
Figure 2A:
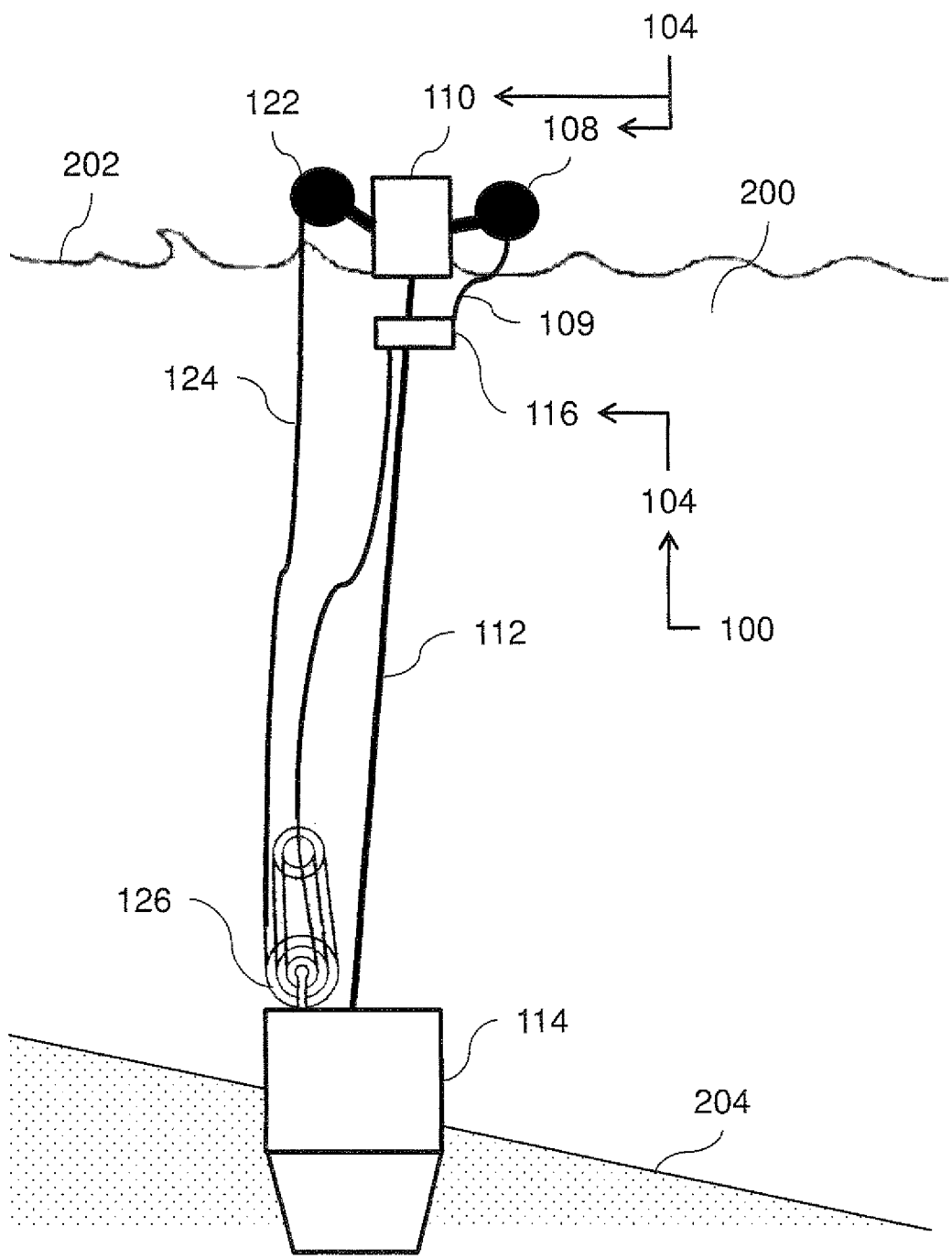
FIG. 2A (SHEET 5/10) depicts yet another example schematic representation of the energy-accumulation apparatus of FIG. 1A.
Figure 2B:
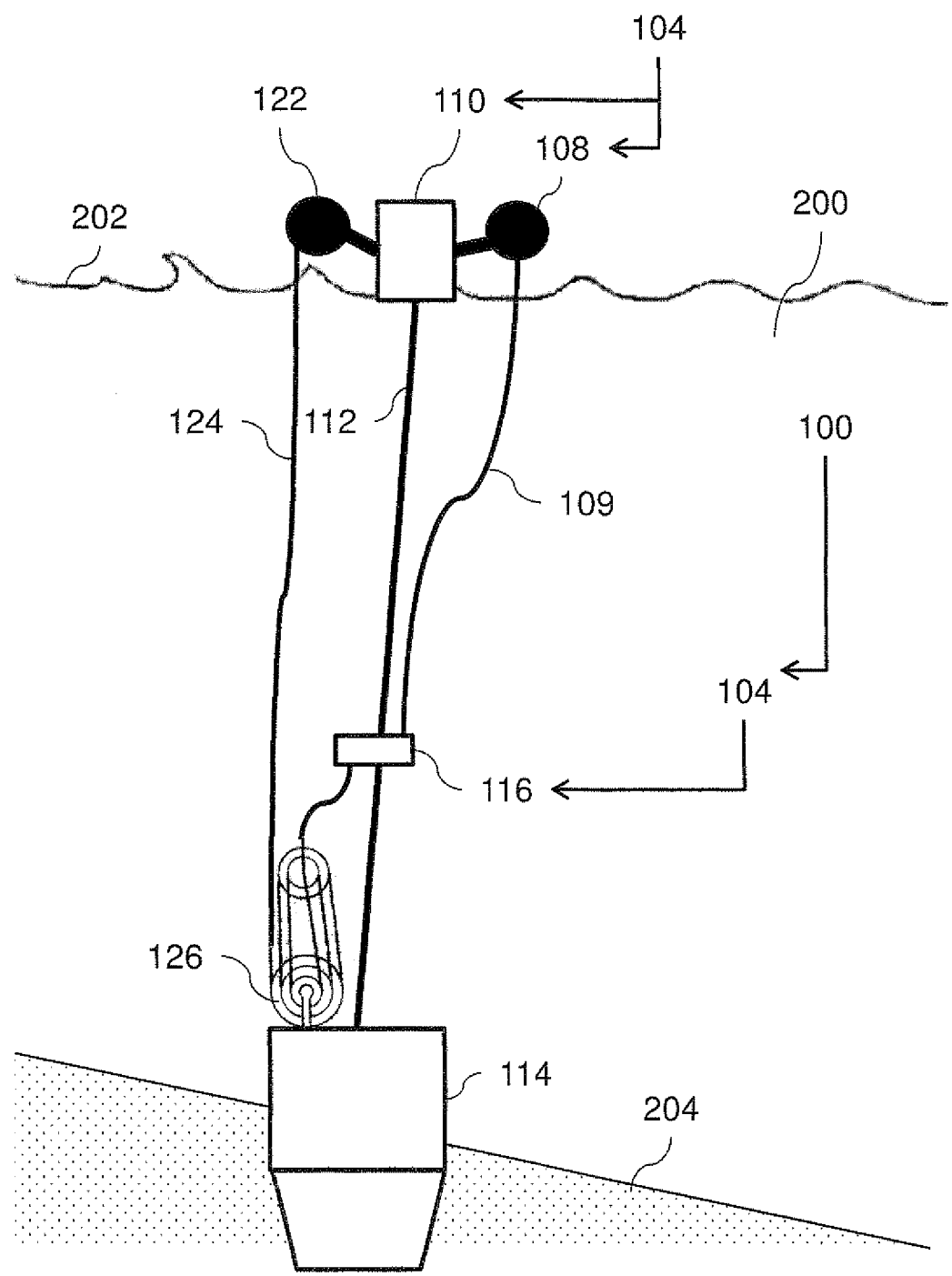
FIG. 2B (SHEET 6/10) depicts yet another example schematic representation of the energy-accumulation apparatus of FIG. 1A.

FIG. 1A (SHEET 1/10), FIG. 1B (SHEET 2/10), FIG. 1C (SHEET 3/10), FIG. 1D (SHEET 4/10), FIG. 2A (SHEET 5/10), and FIG. 2B (SHEET 6/10) depict various example schematic representations of an energy-accumulation apparatus (100) including a variable-buoyancy assembly (102) and a delivery assembly (104).

Referring to FIG. 1A (SHEET 1/10), there is depicted a renewable-energy electric-generating system (900) positioned on the shore (901). The renewable-energy electric-generating system (900) is configured to generate electricity in response to interaction with a renewable-energy source. The renewable-energy electric-generating system (900) includes, for example, any one of a wind-turbine assembly and a solar-panel assembly. The renewable-energy electric-generating system (900) is located or positioned near (proximate to) a body of water (200). The renewable-energy electric-generating system (900) is configured to connect to an electric grid (902).

The renewable-energy electric-generating system (900) is also configured to connect to a pneumatic-generation source (904), and to supply electricity to the pneumatic-generation source (904) during times when there is a relatively lower demand for electricity from the electric grid (902). The renewable-energy electric-generating system (900) may provide electricity to the electric grid (902) during a relatively lower demand from the electric grid (902) while providing electricity to the pneumatic-generation source (904). The pneumatic-generation source (904) is configured to generate pneumatic pressure (air pressure). An air-supply assembly (103) is configured to pneumatically connect, via a switch assembly (906), the pneumatic-generation source (904) to the variable-buoyancy assembly (102), or to the instances of the variable-buoyancy assembly (102) associated with a collection (128), all of which are positioned in the body of water (200). The pneumatic-generation source (904) is configured to fill the instances of the variable-buoyancy assembly (102) with pneumatically-pressurized air.

The variable-buoyancy assembly (102) is operatively connected, via the switch assembly (906) to an electric generator (908). The electric generator (908) is configured to generate electricity using pneumatic pressure as the input source (from the variable-buoyancy assembly (102)); the pneumatically pressurized air is released from the variable-buoyancy assembly (102) in such a way that the electric generator (908) may generate electricity to be immediately provided to the electric grid (902), perhaps when there is a relatively higher electricity demand.

Referring to FIG. 1B (SHEET 2/10), there is depicted an example of the energy-accumulation apparatus (100). The energy-accumulation apparatus (100) includes a variable-buoyancy assembly (102). The variable-buoyancy assembly (102) is configured to be selectively buoyant in a body of water (200) depending on the amount of pneumatic pressure in the variable-buoyancy assembly (102). The energy-accumulation apparatus (100) also includes a delivery assembly (104). The delivery assembly (104) is coupled to the variable-buoyancy assembly (102). The delivery assembly (104) is configured to deliver the variable-buoyancy assembly (102) within the body of water (200) between a first position and a second position. In the first position, the variable-buoyancy assembly (102) is serviceable. Examples of the first position are depicted in FIG. 1B and FIG. 2A. Examples of the second position are depicted in FIG. 1C, FIG. 1D, and FIG. 2B. The delivery assembly (104) is configured to facilitate movement of the variable-buoyancy assembly (102) from (A) the first position in which the variable-buoyancy assembly (102) is non-operational (that is, the variable-buoyancy assembly (102) is not operatively connected to the renewable-energy electric-generating system (900) of FIG. 1A, so that maintenance may be performed on the variable-buoyancy assembly (102)) to (B) the second position in which the variable-buoyancy assembly (102) is operational (that is the variable-buoyancy assembly (102) is operated in association the renewable-energy electric-generating system (900)).

Buoyancy is an upward force exerted by a fluid that opposes the weight of an immersed object. For instance, in a column of fluid, pressure increases with depth as a result of the weight of the overlying fluid. An object, submerged in the fluid, experiences greater pressure at the bottom of the column of fluid than at the top of the column of fluid. This difference in pressure results in a net force that tends to accelerate an object upwards. The magnitude of that force is proportional to the difference in the pressure between the top and the bottom of the column of fluid, and is also equivalent to the weight of the fluid that would otherwise occupy the fluid displaced by the object. For this reason, an object whose density is greater than that of the fluid in which it is submerged tends to sink. If the object is either less dense than the liquid or is shaped appropriately (as in a boat), the buoyancy force can keep the object afloat. This can occur only in a reference frame which either has a gravitational field, or in which the reference frame accelerates due to a force other than gravity defining a "downward" direction (that is, a non-inertial reference frame). In a situation of fluid statics, the net upward buoyancy force is equal to the magnitude of the weight of fluid displaced by the body or object, such as the variable-buoyancy assembly (102).

The variable-buoyancy assembly (102) is an assembly whose buoyancy may vary depending on the amount of internal pneumatic of the variable-buoyancy assembly (102) while the variable-buoyancy assembly (102) is immersed and held in the body of water (200). The amount of internal pneumatic pressure existing within the variable-buoyancy assembly (102) may vary and so the buoyancy force of the variable-buoyancy assembly (102) may vary as well. An example of the variable-buoyancy assembly (102) is described in connection with FIG. 1D.

The body of water (200) is defined as the part of the earth's surface covered with water, such as a river or a lake or an ocean.

The delivery assembly (104) is defined as any combined collection of components that are arranged or are configured to deliver the variable-buoyancy assembly (102) within the body of water (200) between the first position to the second position. In the first position, the variable-buoyancy assembly (102) is serviceable (and in a non-operational mode). The second position, the variable-buoyancy assembly (102) is on-line (and in an operational mode). The first position is spaced apart from the second position.

FIG. 1B (SHEET 2/10) depicts an example of the first position of the variable-buoyancy assembly (102). In the first position, the variable-buoyancy assembly (102) is positioned proximate to a water surface (202) of the body of water (200), and the variable-buoyancy assembly (102) exists in an un-pressurized condition (state). The variable-buoyancy assembly (102) simply floats on the water surface (202) while the variable-buoyancy assembly (102) remains un-pressurized.

An anchor-connection line (112) is connected to a flotation assembly (110) located at the water surface (202) of the body of water (200). The anchor-connection line (112) extends downwardly to the floor (204). The flotation assembly (110) is positioned above an anchor assembly (114). The anchor assembly (114) is positioned on the floor (204). Once the anchor assembly (114) is positioned in a stationary condition to the floor (204) of the body of water (200), then the variable-buoyancy assembly (102) is connected to the connection assembly (116). The connection assembly (116) is configured to slide along a length of the anchor-connection line (112). In the manner, the variable-buoyancy assembly (102) slidably couples the anchor-connection line (112) via the connection assembly (116) so that the variable-buoyancy assembly (102) may move between the first position located proximate to the flotation assembly (110), and the second position located proximate to the anchor assembly (114). The delivery assembly (104) is connected to the variable-buoyancy assembly (102) by a lead line extending from the variable-buoyancy assembly (102) and terminating at the connection assembly (116). The connection assembly (116) is slide connected to the anchor-connection line (112).

In accordance with an option, the connection assembly (116) may include a clamp assembly (known and not depicted), such as a Lewis clamp, for instance. The clamp assembly is configured to hold or to secure objects tightly together in such a way as to prevent movement or separation of the objects through application of clamp pressure (clamp force). The clamp assembly is configured to position components so that the components remain stationary to each other while being clamped together. For the ease where the connection assembly (116) includes the clamp assembly. The connection assembly (116) is configured to clamp the connection assembly (116) to the anchor-connection line (112). The connection assembly (116) is configured to take a buoyance force from the variable-buoyancy assembly (102) once the variable-buoyancy assembly (102) is inflated (pressurized), and transfer the buoyance force from the variable-buoyancy assembly (102) to the connection assembly (116), then to the anchor-connection line (112) and then to the anchor assembly (114). The connection assembly (116) is configured to fixedly fasten the variable-buoyancy assembly (102) to the anchor-connection line (112), preferably to a robust portion of the anchor-connection line (112) at a position located at proximate to the anchor assembly (114). The anchor-connection line (112) is configured to be strong enough at least at the bottom section of the anchor-connection line (112) for the case where the connection assembly (116) is fixedly secured (clamped) to the anchor-connection line (112) by operation of the clamp assembly.

In accordance with an option, the delivery assembly (104) includes a combination of the flotation assembly (110), a take-up reel (108), and the connection assembly (116). The flotation assembly (110) includes any one of a buoy, a boat, a ship, and any equivalent thereof. The flotation assembly (110) is configured to float, at least in part, on the water surface (202) of the body of water (200). The take-up reel (108) has a service line (109). The take-up reel (108) is configured to be supported by the flotation assembly (110). The connection assembly (116) is configured to connect the service line (109) with the variable-buoyancy assembly (102). The take-up reel (108) is configured to move the service line (109) in such a way that the connection assembly (116) is movable between the first position and the second position once the take-up reel (108) is actuated to do just so.

In accordance with an option, as depicted in FIG. 1B, FIG. 1C and FIG. 1D, the connection assembly (116) is configured to be weighted with enough weight such that once the connection assembly (116) is released in water, the weight of the connection assembly (116) drags the variable-buoyancy assembly (102) from the first position to the second position. In the manner, gravity acts to pull on the connection assembly (116) for this option, and the connection assembly (116) then free falls toward the floor (204). The service line (109) and the take-up reel (108) are configured to regulate the speed of free fall of the connection assembly (116).

FIG. 1C (SHEET 3/10) and FIG. 1D (SHEET 4/10) depict an example of the second position of the variable-buoyancy assembly (102). In the second position, the variable-buoyancy assembly (102) is positioned proximate to the floor (204) beneath the body of water (200) and proximate to the anchor assembly (114). While in the second position, the variable-buoyancy assembly (102) is changeable between the unpressurized condition (as depicted in FIG. 1C) and a pressurized condition (as depicted in FIG. 1D). The unpressurized condition may be referred to as a deflated condition or state, and the pressurized condition may be referred to as an inflated condition or state. The floor (204) may include a sea floor, a lake floor, etc., and any equivalent thereof.

Referring now to FIG. 1D (SHEET 4/10), there is depicted an example of the variable-buoyancy assembly (102). In accordance with an option, the variable-buoyancy assembly (102) is configured to provide a pneumatically-pressurizable chamber (120). Pressurizable means capable of being pressurized. By way of example, the variable-buoyancy assembly (102) includes a flexible-wall bladder (118). The variable-buoyancy assembly (102) may include a balloon, a bag, an under-water air cavity, a marine lift bag, etc., and any equivalent thereof. The flexible-wall bladder (118) is configured to inflate (under internal pneumatic pressure when the internal pressure is greater than the external pressure). The flexible-wall bladder (118) is also configured to deflate (under lack of applied internal pressure to the variable-buoyancy assembly (102). The flexible-wall bladder (118) is configured to inflate and deflate in response to pneumatic communication with the pneumatic-generation source (904) of FIG. 1A. The air-supply assembly (103) is operatively connected to the variable-buoyancy assembly (102) and then the variable-buoyancy assembly (102) is selectively pneumatically connected with the electric generator (908) and the switch assembly (906) via the switch assembly (906) of FIG. 1A.

The variable-buoyancy assembly (102) is configured to be disposed at an underwater depth within the body of water (200). The variable-buoyancy assembly (102) is configured to receive, store, and discharge compressed air, under pneumatic pressure. The variable-buoyancy assembly (102) is configured to be subjected to an ambient hydrostatic pressure when disposed underwater, the ambient hydrostatic pressure being provided by the water column above and surrounding the variable-buoyancy assembly (102). The variable-buoyancy assembly (102) includes an inlet and outlet air valves configured to facilitate ingress and egress of compressed air. When the stored air is discharged from variable-buoyancy assembly (102), the discharge pressure is governed by the ambient hydrostatic pressure. The ambient hydrostatic pressure depends on the underwater depth of the variable-buoyancy assembly (102). Once the discharge pressure is defined, and then the underwater depth for locating the variable-buoyancy assembly (102) may be determined, which provides an ambient hydrostatic pressure. Since the hydrostatic pressure is constant for a given depth, the stored air can be discharged via the air-supply assembly (103) at a pressure.

Referring now to FIG. 2A (SHEET 5/10) and FIG. 2B (SHEET 6/10), in accordance with an option, the delivery assembly (104) includes a combination of the anchor assembly (114) and an anchor-connection line (112). The anchor-connection line (112) may include a tether assembly, a line assembly or a wire assembly, and any equivalent thereof. In FIG. 2A and FIG. 2B, the variable-buoyancy assembly (102) of FIG. 1D is not depicted for the sake of improving the view of the delivery assembly (104). The anchor assembly (114) is configured to be anchored to the floor (204) of the body of water (200). The anchor-connection line (112) is configured to connect the flotation assembly (110) to the anchor assembly (114). The connection assembly (116) is configured to be moved along the anchor-connection line (112) between the first position (as depicted in FIG. 1B or FIG. 2A) and the second position (as depicted in FIG. 1C or FIG. 2B). The anchor assembly (114) may include a torpedo pile, a rock anchor or a vertical-load anchor, etc., and any equivalent thereof.

In accordance with an option (depicted in FIG. 2A and FIG. 2B), the connection assembly (116) does not have sufficient weight to drag the variable-buoyancy assembly (102) from the first position to the second position (in gravitational free fall). In keeping with this option, the delivery assembly (104) further includes a combination of an auxiliary take-up reel (122) and a pulley assembly (126) and the auxiliary connection line (124). The auxiliary take-up reel (122) is configured to be supported by the flotation assembly (110). The auxiliary take-up reel (122) has the auxiliary connection line (124). The pulley assembly (126) is fixedly mounted to the anchor assembly (114). The auxiliary connection line (124) extends from the auxiliary take-up reel (122) to the pulley assembly (126) and then to the connection assembly (116). When it is required to move the variable-buoyancy assembly (102) between the second position and the first position, the auxiliary take-up reel (122) is activated to move the auxiliary connection line (124) to force the variable-buoyancy assembly (102) to move, as may be required.

In accordance with another option, the connection assembly (116) does have sufficient weight to drag the variable-buoyancy assembly (102) from the first position to the second position (as mentioned in the description associated with FIG. 1B). In this option, the delivery assembly (104) may further include the combination of the auxiliary take-up reel (122) and the pulley assembly (126) if so desired. For this option, the auxiliary take-up reel (122) is a back-up for the take-up reel (108) in case the take-up reel (108) becomes defective.

Figure 3:
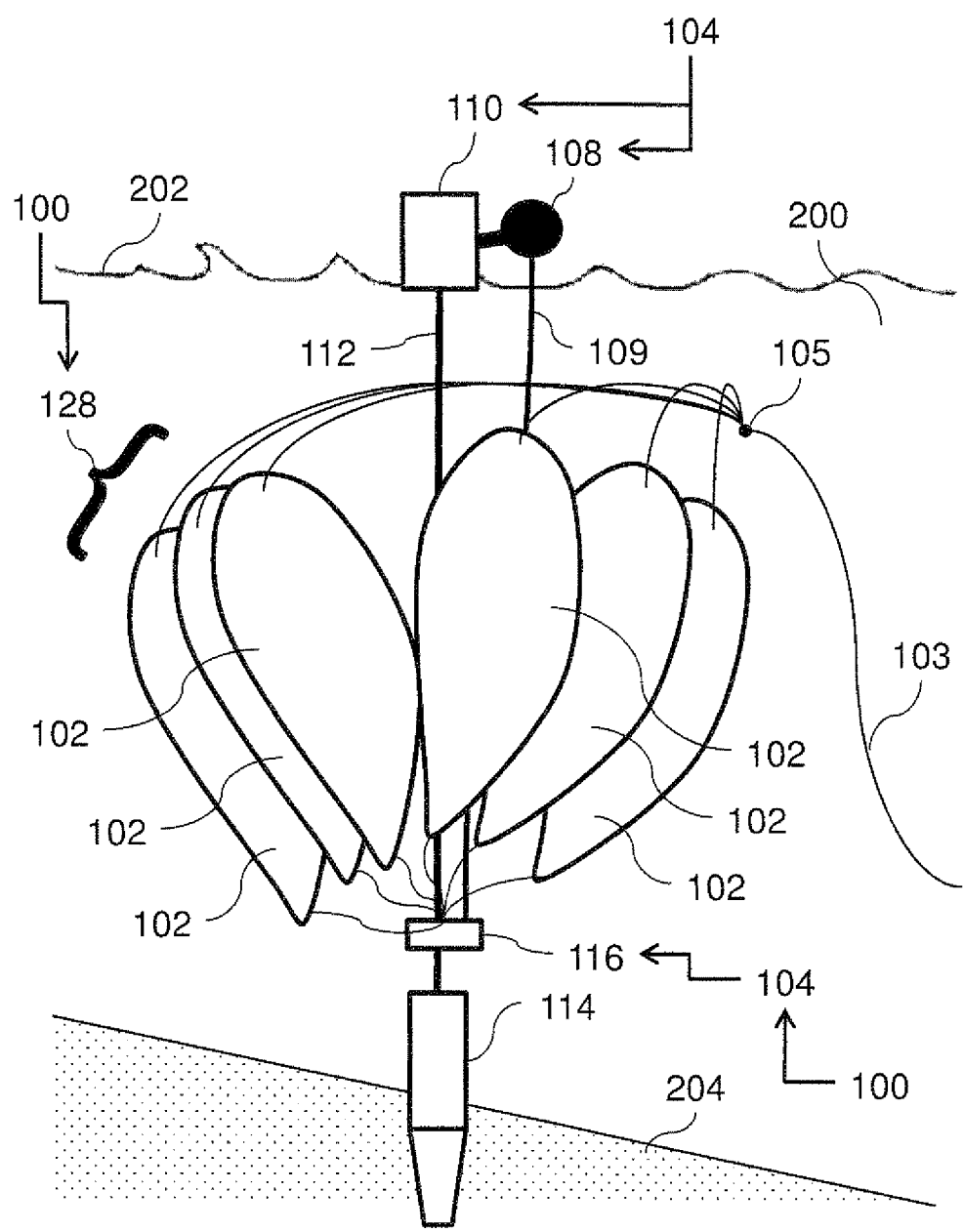
FIG. 3 (SHEET 7/10) depicts yet another example schematic representation of the energy-accumulation apparatus of FIG. 1A.
Figure 4A:
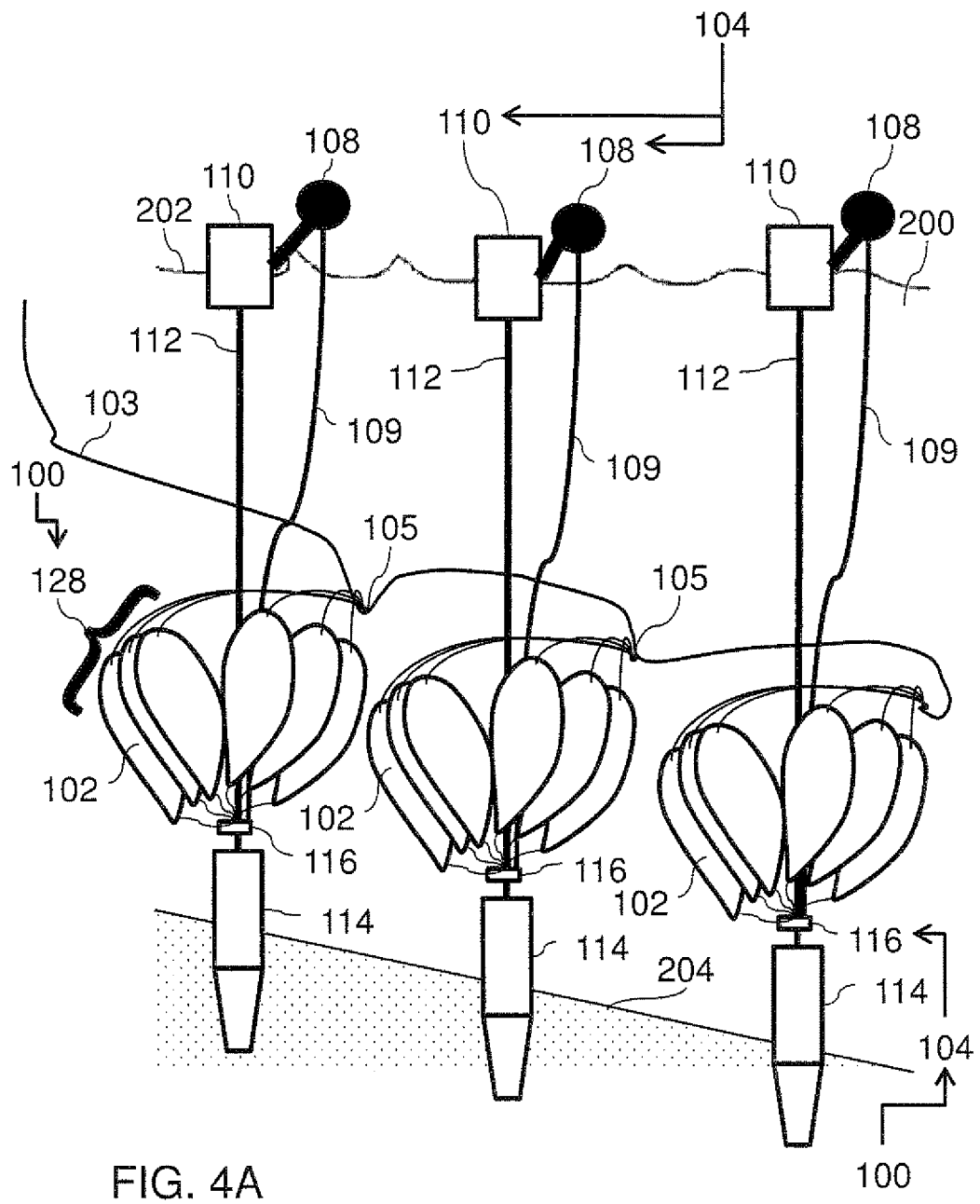
FIG. 4A (SHEET 8/10) depicts yet another example schematic representation of the energy-accumulation apparatus of FIG. 1A.
Figure 4B:
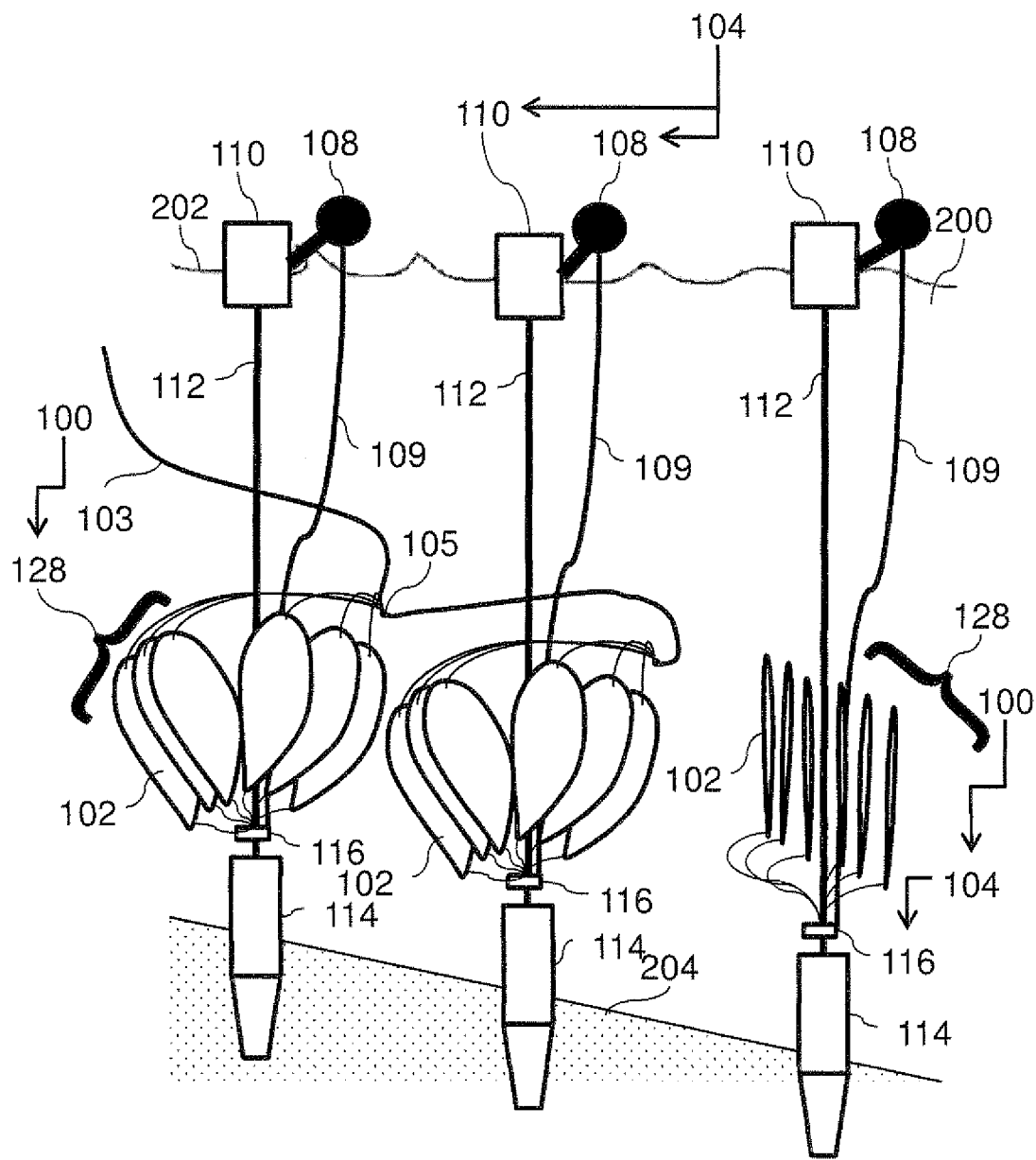
FIG. 4B (SHEET 9/10) depicts yet another example schematic representation of the energy-accumulation apparatus of FIG. 1A.
Figure 4C:
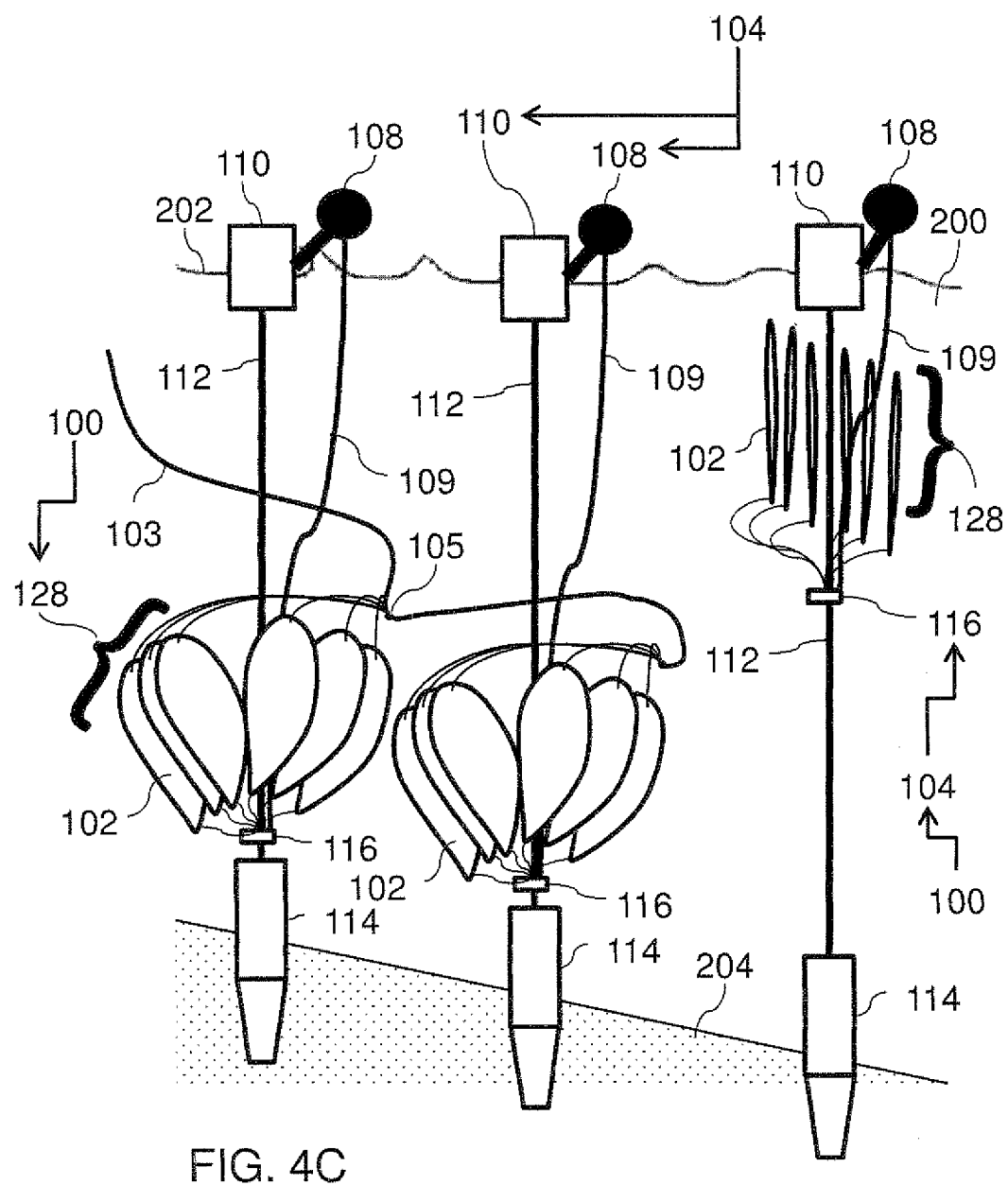
FIG. 4C (SHEET 10/10) depicts yet another example schematic representation of the energy-accumulation apparatus of FIG. 1A.

FIG. 3 (SHEET 7/10), FIG. 4A (SHEET 8/10), FIG. 4B (SHEET 9/10), and FIG. 4C (SHEET 10/10) depict various example schematic representations of the energy-accumulation apparatus (100) in which the variable-buoyancy assembly (102) is a member of a collection (128) having instances of the variable-buoyancy assembly (102).

Referring to FIG. 3 (SHEET 7/10), the variable-buoyancy assembly (102) is a member of a collection (128). The collection (128) has (or includes) instances of the variable-buoyancy assembly (102). Each instances of the variable-buoyancy assembly (102) is configured to connect to the connection assembly (116) via a leader line. Each instance of the variable-buoyancy assembly (102) is also configured to be connected in pneumatic communication with the air-supply assembly (103). More specifically, each instance of the variable-buoyancy assembly (102) is also configured to be connected in pneumatic communication with an air-line joint (105) of the air-supply assembly (103). The air-supply assembly (103) is selectively pneumatically connected to the electric generator (908) or to the pneumatic-generation source (904) depending on the state of the switch assembly (906) of FIG. 1A.

Referring to FIG. 4A (SHEET 8/10), the instances of the variable-buoyancy assembly (102) are each positioned in operation, via the air-supply assembly (103), in selective pneumatically connection to the electric generator (908) or to the pneumatic-generation source (904) depending on the state of the switch assembly (906) of FIG. 1A.

Referring to FIG. 4B (SHEET 9/10), the collection (128) is positionable at the second position. In the second position, each member of the collection (128) is changeable between the deflated condition and an inflated condition.

Referring to FIG. 4C (SHEET 10/10), the collection (128) is positionable at the first position. The collection (128) is movable between the first position (as depicted in FIG. 4C) and the second position (as depicted in FIG. 4B) while the collection (128) remains in the deflated condition. In the first position, maintenance may be performed on the variable-buoyancy assembly (102) (a selected member of the collection (128)), or on each instance of the variable-buoyancy assembly (102) belonging to the collection (128).

A technical advantage of the energy-accumulation apparatus (100) is the ease of periodic maintenance and/or emergency repair that may be provided to the energy-accumulation apparatus (100), and especially to the variable-buoyancy assembly (102).

For the case where maintenance is required to be performed on a single instance of the variable-buoyancy assembly (102) as depicted in FIG. 1D, the variable-buoyancy assembly (102) is deflated or un-pressurized (drained of air) as depicted in FIG. 1C); then, the connection assembly (116) is unclamped from the anchor-connection line (112) in such a way that the variable-buoyancy assembly (102) is unclamped and then the variable-buoyancy assembly (102) may be movable from the second position (FIG. 1C) to the first position (FIG. 1B) along the anchor-connection line (112). The variable-buoyancy assembly (102) may be pulled by the service line (109) once the take-up reel (108) is activated to do just so. In this manner, the variable-buoyancy assembly (102) is moved along (slides up) the anchor-connection line (112) from the second position to the first position and toward the water surface (202); once the variable-buoyancy assembly (102) is placed in the first position, the variable-buoyancy assembly (102) may be inspected and/or may receive maintenance or repair (any type of servicing), either in water or out of water and in a boat or a ship.

For the case where maintenance is required to be performed on the collection (128) of FIG. 4A, each instance of the variable-buoyancy assembly (102) of the collection (128) is drained of air (as depicted in FIG. 4B); then, the connection assembly (116) is unclamped in such a way that the collection (128) may be movable from the second position (FIG. 4B) to the first position (FIG. 4C). The service line (109) is then pulled, via the take-up reel (108), in such a way that the collection (128) slides up (moves along) the anchor-connection line (112) from the second position to the first position and toward the water surface (202). Once the collection (128) is placed in the first position, the collection (128) may be inspected and/or receive maintenance or repair or any type of servicing (while positioned in water or while positioned out of water and/or while positioned in a boat or a ship).

In view of the foregoing, there is provided a method. The method includes (and is not limited to) the following operation: delivering the variable-buoyancy assembly (102) within the body of water (200) between the first position (as depicted in FIG. 1B) to the second position (as depicted in FIG. 1C), preferably as the variable-buoyancy assembly (102) remains in the un-pressurized (deflated) condition (state). It will be appreciated that the variable-buoyancy assembly (102) may be pressurized in the first position and then moved to the second position while in the pressurized condition (if so desired)—but this option may be difficult to execute. Movement of the variable-buoyancy assembly (102) is facilitated from (A) the first position in which the variable-buoyancy assembly (102) is non-operational (in association the renewable-energy electric-generating system (900) of FIG. 1A, in which servicing or maintenance or repair may be performed on the variable-buoyancy assembly (102)) to (B) the second position in which the variable-buoyancy assembly (102) is operational (in association operation with the renewable-energy electric-generating system (900)).

In summary, the method is for servicing the energy-accumulation apparatus (100). The method includes (and is not limited to) delivering the variable-buoyancy assembly (102) of the energy-accumulation apparatus (100) between the first position to the second position in such a way that in the first position, the variable-buoyancy assembly (102) is serviceable. The variable-buoyancy assembly (102) is configured to be selectively buoyant within the body of water (200).

The method may further include, for the case where maintenance is required to be performed on the variable-buoyancy assembly (102), the following operations: (A) un-pressurizing the variable-buoyancy assembly (102); (B) un-clamping the variable-buoyancy assembly (102) from the anchor-connection line (112); (C) moving the variable-buoyancy assembly (102) the second position to the first position along the anchor-connection line (112); and (D) performing maintenance on the variable-buoyancy assembly (102) once the variable-buoyancy assembly (102) is placed in the first position.

The method may further include the following operation: moving the variable-buoyancy assembly (102) from the second position to the first position along an anchor-connection line (112) by pulling the service line (109) in such a way that the variable-buoyancy assembly (102) moves along the anchor-connection line (112) from the second position to the first position and toward the water surface (202).

It will be appreciated that the method may be used or applied in connection with the examples depicted in the figures.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, or components that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. An energy-accumulation apparatus, comprising:
   a pneumatic-generation source being positioned on a shore, and the pneumatic-generation source being configured to receive electricity and to generate pneumatic air pressure by electricity usage; and
   an electric generator being positioned on the shore, and the electric generator being configured to receive the pneumatic air pressure and to generate electricity by pneumatic air pressure usage; and
   a variable-buoyancy assembly being configured to be selectively buoyant in a body of water; and
   a delivery assembly being coupled to the variable-buoyancy assembly, and the delivery assembly being configured to deliver the variable-buoyancy assembly within the body of water between a first position and a second position; and
   an air-supply assembly being pneumatically connected to the variable-buoyancy assembly, and
   a switch assembly being pneumatically connected to the air-supply assembly, and the air-supply assembly being selectively pneumatically connectable to the electric generator and to the pneumatic-generation source depending on the state of the switch assembly, and the switch assembly being configured to selectively pneumatically connect the pneumatic-generation source to the variable-buoyancy assembly in such a way that the variable-buoyancy assembly receives pneumatic air pressure from the pneumatic-generation source, and the switch assembly being configured to selectively pneumatically connect the variable-buoyancy assembly to the electric generator in such a way that the electric generator generates electricity by using pneumatic air pressure as an input source from the variable-buoyancy assembly; and
   the variable-buoyancy assembly being configured to be disposed at an underwater depth within the body of water, and the variable-buoyancy assembly being configured to receive, store, and discharge compressed air, under pneumatic air pressure, and the variable-buoyancy assembly being configured to be subjected to an ambient hydrostatic pressure when disposed underwater, and the ambient hydrostatic pressure being provided by the water column above and surrounding the variable-buoyancy assembly so that when stored air is discharged from the variable-buoyancy assembly, the discharge pressure is governed by the ambient hydrostatic pressure; and
   in the first position, the variable-buoyancy assembly being positioned proximate to a water surface of the body of water, and the variable-buoyancy assembly being serviceable and being in a non-operational mode, and the variable-buoyancy assembly being in an unpressurized deflated condition, and the variable-buoyancy assembly being non-operational so that maintenance is performable on the variable-buoyancy assembly; and
   in the second position, the variable-buoyancy assembly being positioned and fixedly fastened proximate to the floor beneath the body of water, and the variable-buoyancy assembly being on-line and being in an operational mode, and the variable-buoyancy assembly being changeable between the unpressurized deflated condition and a pressurized inflated condition in which the variable-buoyancy assembly is inflated; and
   in the second position, the variable-buoyancy assembly being operable to:
     receive pneumatically pressurized air from the pneumatic-generation source via the switch assembly, and
     store the pneumatically pressurized air that was received from the switch assembly, and
     discharge the pneumatically pressurized air that was stored in the variable-buoyancy assembly to the electric generator via the switch assembly in such a way that the electric generator generates electricity by using the pneumatically pressurized air received from the variable-buoyancy assembly via the switch assembly.

2. The energy-accumulation apparatus of claim 1, wherein:
   the variable-buoyancy assembly is configured to provide a pneumatically-pressurizable chamber.

3. The energy-accumulation apparatus of claim 1, wherein:
   the variable-buoyancy assembly includes:
     a flexible-wall bladder being configured to inflate and deflate in response to pneumatic communication with a pneumatic-pressure source.

4. The energy-accumulation apparatus of claim 1, wherein:
   a flexible-wall bladder being configured to inflate and deflate in response to pneumatic communication with a pneumatic-pressure source, and the flexible-wall bladder is configured to define a pneumatically-pressurizable chamber.

5. The energy-accumulation apparatus of claim 1, wherein:
   the body of water includes any one of a river, a lake and an ocean.

6. The energy-accumulation apparatus of claim 1, wherein:
   the delivery assembly includes:
     a flotation assembly being configured to float, at least in part, on the water surface of the body of water;

a take-up reel having a service line, the take-up reel being configured to be supported by the flotation assembly; and a connection assembly being configured to connect the service line with the variable-buoyancy assembly, and the take-up reel being configured to move the service line in such a way that the connection assembly is movable between the first position and the second position.

7. The energy-accumulation apparatus of claim 1, wherein:
the delivery assembly includes:
an anchor assembly being configured to be anchored to the floor of the body of water; and
an anchor-connection line being configured to connect a flotation assembly to the anchor assembly; and
a connection assembly being configured to be moved along the anchor-connection line between the first position and the second position.

8. The energy-accumulation apparatus of claim 1, wherein:
a connection assembly is configured to be weighted with enough weight such that a weight of the connection assembly drags the variable-buoyancy assembly from the first position to the second position.

9. The energy-accumulation apparatus of claim 1, wherein:
a connection assembly does not have sufficient weight to drag the variable-buoyancy assembly from the first position to the second position.

10. The energy-accumulation apparatus of claim 1, wherein:
the delivery assembly further includes:
an auxiliary take-up reel being configured to be supported by a flotation assembly, the auxiliary take-up reel having an auxiliary connection line; and
a pulley assembly being mounted to an anchor assembly, and the auxiliary connection line extending from the auxiliary take-up reel to the pulley assembly and then to a connection assembly.

11. The energy-accumulation apparatus of claim 1, wherein:
the variable-buoyancy assembly is a member of a collection having instances of the variable-buoyancy assembly each being connected to a connection assembly.

12. The energy-accumulation apparatus of claim 1, wherein:
the variable-buoyancy assembly is a member of a collection having instances of the variable-buoyancy assembly each being configured to be:
connected to a connection assembly, and
connected in pneumatic communication with the air-supply assembly.

13. The energy-accumulation apparatus of claim 1, wherein:
the variable-buoyancy assembly is a member of a collection having instances of the variable-buoyancy assembly each being:
connected to a connection assembly; and
connected in pneumatic communication with an air-line joint of the air-supply assembly.

14. The energy-accumulation apparatus of claim 1, wherein:
the variable-buoyancy assembly is a member of a collection having instances of the variable-buoyancy assembly, and the collection being positionable at the second position.

15. The energy-accumulation apparatus of claim 1, wherein:
the variable-buoyancy assembly is a member of a collection having instances of the variable-buoyancy assembly, and the collection being positioned at the second position, in which each member of the collection is changeable between the unpressurized deflated condition and the pressurized inflated condition.

16. The energy-accumulation apparatus of claim 1, wherein:
the variable-buoyancy assembly is a member of a collection having instances of the variable-buoyancy assembly, and the collection being positionable at the first position.

17. The energy-accumulation apparatus of claim 1, wherein:
the variable-buoyancy assembly is a member of a collection having instances of the variable-buoyancy assembly, and the collection being movable between the first position and the second position while the collection remains in a deflated condition.

18. The energy-accumulation apparatus of claim 1, wherein:
a connection assembly is configured to:
take a buoyant force from the variable-buoyancy assembly; and
fixedly fasten the variable-buoyancy assembly to an anchor-connection line.

19. The energy-accumulation apparatus of claim 1, wherein:
the delivery assembly is configured to facilitate movement of the variable-buoyancy assembly from (A) the first position in which the variable-buoyancy assembly is non-operational in association with a renewable-energy electric-generating system, and maintenance may be performed on the variable-buoyancy assembly, to (B) the second position in which the variable-buoyancy assembly is operational in association with the renewable-energy electric-generating system.

20. A renewable-energy electric-generating system, including:
the energy-accumulation apparatus of claim 1.

21. A renewable-energy electric-generating system being configured to connect to an electric grid, including:
the energy-accumulation apparatus of claim 1, and
the renewable-energy electric-generating system also being configured to connect to the pneumatic-generation source, and to supply electricity to the pneumatic-generation source;
the pneumatic-generation source being configured to generate pneumatic pressure via the air-supply assembly, and the air-supply assembly is configured to pneumatically connect, via the switch assembly, the pneumatic-generation source to the variable-buoyancy assembly positioned in the body of water, and the pneumatic-generation source is configured to fill the variable-buoyancy assembly with pneumatically-pressurized air;
the variable-buoyancy assembly is operatively connected the electric generator, and the electric generator is configured to generate electricity using pneumatic pressure as the input source from the variable-buoyancy assembly; and
the electric generator is configured to generate electricity to be provided to the electric grid.

22. An electric grid, including the energy-accumulation apparatus of claim 1.

* * * * *